(12) United States Patent
Gergely et al.

(10) Patent No.: US 10,933,590 B2
(45) Date of Patent: Mar. 2, 2021

(54) JOINING THERMOPLASTIC WORKPIECES WITH INDUCTION HEATING

(71) Applicant: GM GLOBAL TECHNOLOGY OPERATIONS LLC, Detroit, MI (US)

(72) Inventors: Ryan Gergely, Fraser, MI (US); Blair E. Carlson, Ann Arbor, MI (US); David A. Okonski, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 39 days.

(21) Appl. No.: 16/355,209

(22) Filed: Mar. 15, 2019

(65) Prior Publication Data

US 2020/0290290 A1    Sep. 17, 2020

(51) Int. Cl.
| | |
|---|---|
| *B29C 65/14* | (2006.01) |
| *B29C 65/36* | (2006.01) |
| *B29C 65/78* | (2006.01) |
| B29K 507/04 | (2006.01) |
| B29K 101/12 | (2006.01) |

(52) U.S. Cl.
CPC ........ *B29C 65/148* (2013.01); *B29C 65/3616* (2013.01); *B29C 65/3644* (2013.01); *B29C 65/3684* (2013.01); *B29C 65/7844* (2013.01); *B29K 2101/12* (2013.01); *B29K 2507/04* (2013.01)

(58) Field of Classification Search
CPC .............. B29C 65/148; B29C 65/3616; B29C 65/3644; B29C 65/3684; B29C 65/7844
See application file for complete search history.

(56) References Cited

U.S. PATENT DOCUMENTS

| | | | | |
|---|---|---|---|---|
| 3,574,031 | A | * | 4/1971 | Heller et al. ........ B29C 65/1632 156/272.2 |
| 2010/0021683 | A1 | * | 1/2010 | Junghans .................. H05B 3/34 428/116 |
| 2016/0167353 | A1 | * | 6/2016 | Fan .......................... B32B 27/08 216/39 |
| 2016/0341234 | A1 | * | 11/2016 | Germann ............... B21J 15/147 |

FOREIGN PATENT DOCUMENTS

JP         07032491 A  *  2/1995  ............. B29C 66/54

OTHER PUBLICATIONS

Machine Translation of JP-07032491-A (Year: 1995).*

* cited by examiner

*Primary Examiner* — Daniel McNally

(57) ABSTRACT

A method of joining workpieces includes the steps of bringing a first workpiece and a second workpiece together, induction heating a susceptor material, and pressing the workpieces together. Each workpiece may include a thermoplastic material, and the workpieces are brought together at a joint interface so that a protrusion of the first workpiece is aligned with a receptacle of the second workpiece. The susceptor material is in contact with the thermoplastic material of the first workpiece during heating such that the thermoplastic material of the first workpiece softens. The step of pressing is performed while the thermoplastic material of the first workpiece is softened, thereby reshaping the first workpiece where the susceptor material is in contact with the thermoplastic material of the first workpiece. The protrusion is deformed to form an interlock with the receptacle at the joint interface.

19 Claims, 3 Drawing Sheets

JOINING THERMOPLASTIC WORKPIECES WITH INDUCTION HEATING

INTRODUCTION

Induction heating has enjoyed some success in various applications in which relatively fast and efficient material heating is useful, such as in metallurgical furnaces, cooking, welding, and heat-treating processes. Induction heating generally works by exposing an article to a high-frequency alternating magnetic field that induces an alternating electric current in a conductive portion of the article. The inherent resistance to the current flow in the conductive material results in heating of the article. Because the alternating field can penetrate the article, induction heating can heat the article from within, unlike heating via conduction or convection. Induction heating has generally been limited to the heating of metallic materials since a sufficiently high electric current cannot normally be induced in non-metallic materials (e.g., minerals, ceramics, polymers, organics, etc.).

SUMMARY OF THE DISCLOSURE

In accordance with various embodiments, a method of joining workpieces, comprising includes the steps of bringing a first workpiece and a second workpiece together at a joint interface so that a protrusion of the first workpiece is aligned with a receptacle of the second workpiece, induction heating a susceptor material that is in contact with a thermoplastic material of the first workpiece such that the thermoplastic material softens, and pressing the first and second workpieces together while the thermoplastic material is softened, thereby reshaping the first workpiece where the thermoplastic material is softened. The protrusion is deformed to form an interlock with the receptacle at the joint interface.

In various embodiments, the susceptor material is at the joint interface during the step of induction heating so that a thermoplastic material of the second workpiece softens during the step of induction heating.

In various embodiments, the susceptor material is a film comprising a polymeric material that is compatible with the thermoplastic material of the first workpiece so that the polymeric material of the film and the thermoplastic material of the first workpiece intermingle and are bonded together when heated and pressed together.

In various embodiments, the susceptor material is a film comprising a first layer of polymeric material that is compatible with the thermoplastic material of the first workpiece and a second layer of polymeric material that is compatible with a thermoplastic material of the second workpiece so that the first layer of polymeric material and the thermoplastic material of the first workpiece intermingle and are bonded together when heated and pressed together. The second layer of polymeric material and the thermoplastic material of the second workpiece intermingle and are bonded together when heated and pressed together, and the thermoplastic material of the first workpiece is different from the thermoplastic material of the second workpiece.

In various embodiments, the susceptor material is embedded in the thermoplastic material before the step of bringing the workpieces together.

In various embodiments, the first workpiece is formed from a thermoplastic composite material comprising electrically conductive fibers distributed within a matrix material, wherein the fibers are the susceptor material and the thermoplastic material is the matrix material.

In various embodiments, the first workpiece, the second workpiece, the susceptor material, or any combination thereof includes carbon fibers before the step of induction heating.

In various embodiments, the protrusion has a width sized to be received by the receptacle before the step of bringing the workpieces together. The width of the protrusion is enlarged when the protrusion is deformed such that the protrusion cannot be removed from the receptacle, thereby forming the interlock.

In various embodiments, a protrusion of the second workpiece is aligned with a receptacle of the first workpiece during the step of bringing the workpieces together and a thermoplastic material of the second workpiece softens during the step of induction heating. The protrusion of the second workpiece is deformed during the step of pressing to form an interlock with the receptacle of the first workpiece.

In various embodiments, the protrusion is one of a plurality of protrusions of the first workpiece, and the receptacle is one of a plurality of receptacles of the second workpiece. Each protrusion is aligned with a corresponding receptacle during the step of bringing the workpieces together. A corresponding plurality of interlocks is formed by deformation of each of the protrusions while in each of the corresponding receptacles.

In various embodiments, the susceptor material is at a side of the first workpiece that faces away from the second workpiece during the step of induction heating.

In various embodiments, the first workpiece includes a sink mark along a side of the first workpiece opposite the protrusion before the step of bringing the workpieces together, and the sink mark is at least partially removed by said reshaping of the first workpiece.

In various embodiments, the susceptor material is part of a tool that is pressed against the first workpiece during the step of pressing such that the tool is heated during the step of induction heating.

In various embodiments, the method includes heat staking the first and second workpieces together.

In various embodiments, the workpieces are brought together between opposing first and second tool portions with the first workpiece being supported by the first tool portion and the protrusion extending through the second workpiece. The step of pressing includes moving the first and second tool portions toward each other so that the second tool portion is in contact with both of the first and second workpieces.

In various embodiments, the second tool portion includes a recess aligned with the protrusion such that the protrusion is deformed to form a head at an end of the protrusion, thereby forming the interlock.

In various embodiments, a recess of the second tool portion is heated during the step of pressing.

In accordance with various embodiments, a method of joining workpieces includes the step of aligning protrusions of a first thermoplastic composite workpiece with receptacles of a second thermoplastic composite workpiece. Each receptacle is sized to receive the respectively aligned protrusion. The method also includes bringing the first and second workpieces together at a joint interface with the protrusions received by the receptacles, induction heating a susceptor material to thereby soften a thermoplastic material of each workpiece at the joint interface, and pressing the workpieces together while the thermoplastic materials are softened so that each protrusion is deformed while received in the respectively aligned protrusion to form a plurality of interlocks at which the workpieces are mechanically fastened together and at which a chemical bond is formed between the workpieces.

In various embodiments, the first and second workpieces are made from composites having thermoplastic components that are incompatible with each other. The susceptor material includes a film including a first polymeric layer that is compatible with the thermoplastic material of the first workpiece and a second polymeric layer that is compatible with the thermoplastic material of the second workpiece with electrical conductors embedded in one or both layers.

In accordance with various embodiments, a method of joining workpieces includes the step of placing a first workpiece comprising a thermoplastic material together with a second workpiece between first and second portions of a heat staking tool so that a protrusion of the first workpiece extends through a receptacle of the second workpiece. The first portion of the tool supports the first workpiece and includes a susceptor material in contact with a side of the first workpiece in which a sink mark is formed opposite the protrusion. The method also includes induction heating the susceptor material to thereby soften the thermoplastic material and moving at least one of the portions of the heat staking tool toward the other portion until the second portion of the tool contacts both the first workpiece and the second workpiece and presses the workpieces together. The second portion of the tool includes a recess aligned with the protrusion and contacts the protrusion before contacting the second workpiece so that a head is formed at an end of the protrusion. The side of the first workpiece in which the sink mark is formed is reshaped when the first and second workpieces are pressed together while the thermoplastic material is softened to thereby at least partially remove the sink mark.

It is envisioned that individual aspects of the above-listed embodiments, the following description, the drawings, and/or the appended claims can be combined in any compatible manner as a claimed invention.

DETAILED DESCRIPTION

As described below, a susceptor material can be used in conjunction with various joint configurations and material deformation to render induction heating useful with polymer-based materials. Interlocking features can be formed during induction heating and, in some cases, workpiece aesthetics can be improved via application of induction heat.

Figure 1:
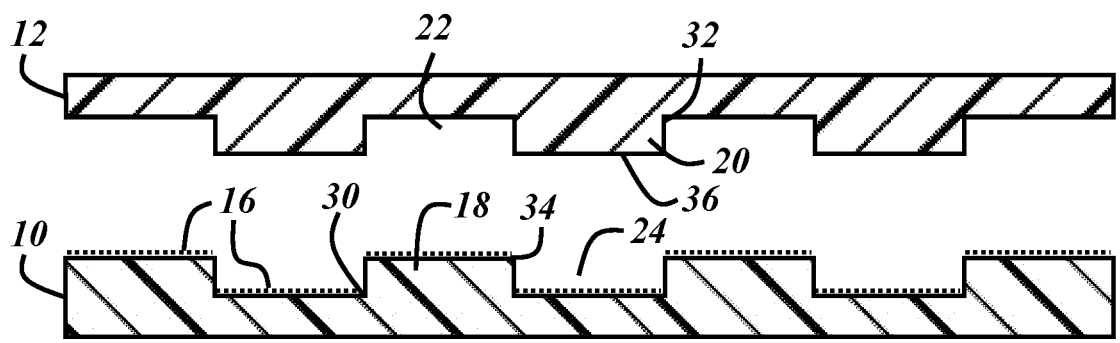
FIG. 1 is a cross-sectional view of two workpieces to be joined.
Figure 2:
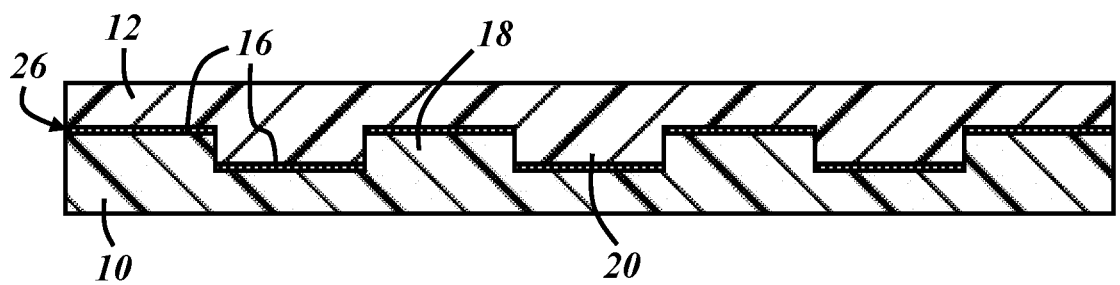
FIG. 2 is a cross-sectional view of the two workpieces of FIG. 1 after being brought together at a joint interface.
Figure 3:
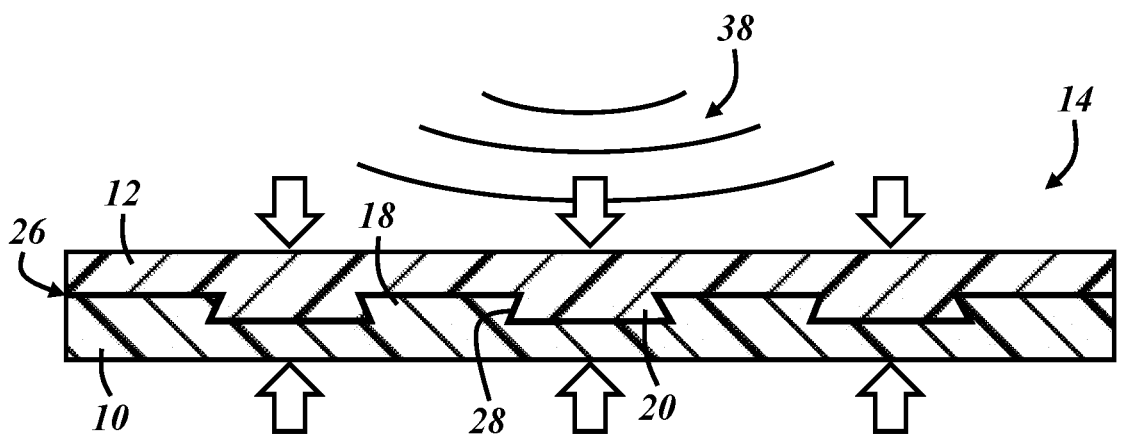
FIG. 3 is a cross-sectional view of the two workpieces of FIG. 1 during induction heating and pressing.

FIGS. 1-3 are cross-sectional views of illustrative first and second workpieces 10, 12 at different stages of a method of joining the workpieces to form an assembled article 14. In FIG. 1, the first workpiece 10 is arranged beneath the second workpiece 12 with a susceptor material 16 disposed between the workpieces. The workpieces are oriented with protrusions 18 of the first workpiece 10 extending toward the second workpiece 12 and protrusions 20 of the second workpiece extending toward the first workpiece. The protrusions 18 of the first workpiece 10 are aligned and in registration with receptacles 22 of the second workpiece 12, and the protrusions 20 of the second workpiece 12 are aligned and in registration with receptacles 24 of the first workpiece 10. FIG. 2 illustrates the workpieces 10, 12 after an exemplary step of bringing the workpieces together at a joint interface 26. FIG. 3 illustrates the workpieces 10, 12 during an exemplary step in which the susceptor material is induction heated while the workpieces are pressed together to reshape the workpieces and/or deform the workpiece protrusions 18, 20 to form an interlock 28 at the joint interface 26.

In the illustrated example, the protrusions 18, 20 of each workpiece are in a uniform alternating arrangement with the receptacles 22, 24 of the same workpiece when provided for the joining process (FIG. 1). In this case, all of the protrusions and receptacles have generally the same width. Each protrusion 18, 20 is a standing feature (e.g., a rib, boss, or post) extending from a respective base 30, 32 to a respective distal end 34, 36, and each receptacle 22, 24 is a recess defined between consecutive protrusions of each workpiece 10, 12. This configuration is non-limiting. There may be as few as one protrusion on only one of the workpieces with as few as one corresponding receptacle on only the other workpiece. The protrusions and receptacles can have various shapes, sizes, orientations, and/or spacing with each interlock-forming protrusion configured to be received by a corresponding receptacle of the other workpiece. Dimensions of the protrusions and recesses may be on a millimeter scale, such as in a range from 0.5 mm to 100 mm—i.e., larger than mere surface textures while small enough to be part of workpieces of a size for which induction heating processes are practical. In a non-limiting example, each workpiece 10, 12 has a thickness of 3.0 mm at each protrusion and 2.5 mm at each receptacle—i.e., each protrusion protrudes 0.5 mm from an otherwise uniform 2.5 mm thickness.

As illustrated in FIG. 2, the method may include the step of bringing the first workpiece 10 and the second workpiece 12 together at the joint interface 26 so that each protrusion 18 of the first workpiece is aligned with and received by the corresponding receptacle 22 of the second workpiece 12. Each protrusion 20 of the second workpiece 12 may also be aligned with and received by the corresponding receptacle 24 of the first workpiece 10, as shown. In this example, the protrusions 18, 20 and corresponding receptacles 22, 24 are configured to fit together in a slip-fit condition, meaning that the workpieces 10, 12 can be separated manually (i.e., without tools) without damaging either workpiece after they are brought together and before any induction heating and/or applied pressure. In other examples, mating protrusions and receptacles may be configured to provide at least temporary attachment to one another (e.g., a press or snap-fit) prior to induction heating and/or applied pressure.

In this embodiment, the joint interface 26 is in the shape of a square wave in cross-section and is defined between the first and second workpieces 10, 12 wherever a surface of one workpiece opposes a surface of the other workpiece. The joint interface 26 thus extends along the distal ends 34, 36 of the protrusions 18, 20 and along sidewalls of each protrusion. The susceptor material 16 is located at the joint interface 26 in FIG. 2. The particular example of the susceptor material 16 illustrated in FIGS. 1 and 2 is in the form of a discontinuous film with discrete segments of the film located at the distal end 34, 36 of each protrusion 18, 20 after the workpieces are brought together. Before the workpieces 10, 12 are brought together (FIG. 1), the segments of susceptor material 16 are located at the distal ends 34 of the protrusions 18 and in the receptacles 24 of the first workpiece 10.

Figure 4:
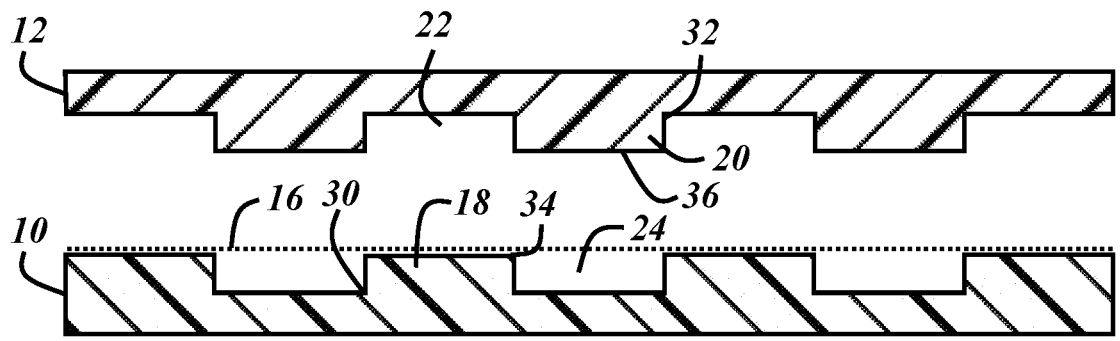
FIG. 4 is a cross-sectional view of the two workpieces of FIG. 1 with a continuous susceptor material disposed therebetween.

Other non-limiting techniques for providing the susceptor material 16 at the joint interface 26 include coating at least a portion of one or both workpieces with the susceptor material, such as by painting or plating, or by extending and supporting a sheet or film of the susceptor material across at least a portion of the space between the two workpieces before the workpieces are brought together (see FIG. 4). The susceptor material 16 need only be provided at locations where induction heating is desired. In some cases, the susceptor material 16 is embedded in the material of one or both workpieces, either throughout the workpiece material as a material additive, or in a surface layer of the workpiece.

In some embodiments, one or both of the workpieces are formed from a thermoplastic composite material comprising a thermoplastic matrix material with the susceptor material distributed and/or embedded within the matrix material as fibers (e.g., carbon and/or metallic fibers), particles, mesh, weave, or in some other suitable form. When a conductive material is distributed in a matrix material of one or both of the workpiece, the separately provided film of susceptor material shown in the figures may be omitted. In some cases, a conductive susceptor material is provided as a filler or reinforcement for the thermoplastic material of the workpiece and additional susceptor material is provided as a layer of material between the workpieces to be joined.

The susceptor material 16 includes a material that is susceptible to induction heating, such as an electrically conductive material and/or a ferromagnetic material. The electrically conductive material may be a metal, a ferrous-based material (e.g., steel), carbon, or graphite, to name a few examples. The susceptor material 16 may be made entirely from the conductive material, or the susceptor material may additionally include other less conductive materials, such as one or more polymeric materials. The conductive material can be in any form (e.g., film, particles, fibers, flakes, fabric, nanostructures, etc.) and quantity that imparts the susceptor material 16 with sufficient susceptibility to induction heating.

In the example of FIGS. 1-3, the susceptor material 16 is provided as a layer of thin film (e.g., less than 500 μm) or tape applied to one of the workpieces 10. The susceptor material 16 may include graphite and/or carbon fibers embedded in a layer of polymeric material in the form of a film, for example. Strips or pads of the susceptor material 16 are provided in the recesses 24 and along the ends 34 of the protrusions 18 of the first workpiece 10 in FIG. 1. In another example, the susceptor material 16 is formed from or includes a fabric of woven carbon fibers and/or metallic fibers and may be a continuous piece of material (see FIGS. 4 and 5).

The susceptor material 16 is provided to enable the induction of current flow at least along the joint interface 26. Use of the susceptor material 16 makes it possible to use an induction heating device to join and/or reshape workpieces formed from non-conductive materials, such as polymer-based materials. Accordingly, each workpiece 10, 12 may include a thermoplastic material. The thermoplastic material of each workpiece 10, 12 is in physical contact with the susceptor material 16 during the step of induction heating, which is illustrated schematically in FIG. 3 with the workpieces 10, 12 in an induction field 38. The induction heated susceptor material 16 conductively heats and thereby softens the thermoplastic material of one or both of the workpieces 10, 12 with which the susceptor material is in contact. The susceptor material is not explicitly shown in FIG. 3 because, after induction heating and pressing, the susceptor material may be embedded in and/or bonded with the workpieces and thus less distinguishable to the naked eye. In examples in which the susceptor material includes a conductive filler material of one or both workpieces, the conductive filler may be considered as the susceptor material which is in physical contact with the thermoplastic matrix material in which the filler is embedded and distributed.

FIG. 3 also depicts an exemplary step of pressing the workpieces 10, 12 together, as indicated by the opposing outline-arrows in the figure. A pressing tool or fixture (not shown) can be used to apply force along the back sides of the workpieces—i.e., the sides of the respective workpieces that face away from each other. The pressing tool may also be the source of the induction field 38 in some cases. The step of pressing is performed while the thermoplastic material of the first and/or second workpiece is softened. The steps of induction heating and pressing may occur simultaneously, sequentially, or temporally overlap. For example, a first amount of force may be applied with the workpieces are brought together with protrusions received in corresponding receptacles, the induction field may then be applied to begin the step of induction heating, and then the pressing force may be increased before or after the thermoplastic material in contact with the susceptor material begins to soften. Induction heating can continue during a portion or all of the step of pressing. In one embodiment, the induction field is deactivated after the workpieces are reshaped to a desired shape, at which time the pressing continues. In other embodiments, the pressing is reduced in magnitude or ceased when the induction field is deactivated.

The combined softening of the thermoplastic material and pressing reshapes one or both workpieces 10, 12. In this example, each of the protrusions 18, 20 is deformed during the pressing step such that the end 34, 36 of each protrusion is widened to a width greater than that of the base 30, 32 of the same protrusion to form the respective interlock 28 with the receptacle into which the protrusion was initially received. Each protrusion 18, 20 in FIG. 3 has a trapezoidal shape in cross-section, with the long side of the trapezoid at the distal end 34, 36. It should be recognized that the depiction of FIG. 3 is somewhat idealized and that the protrusions may deform in some other manner that increases their width elsewhere along the protrusion or otherwise forms an interlocking condition between the protrusions and receptacles. The interlock 28 is a portion of the joint at which the workpieces cannot be separated without damage at least in the direction opposite the assembly direction. In the illustrated example, the interlock 28 thus mechanically prevents the workpieces from being separated or pulled apart in the vertical direction without damage to the workpieces, even in the absence of other bonds, such as chemical bonds. The interlock 28 also inhibits shearing of the two workpieces and prevents the two workpieces from being peeled apart, even in the absence of chemical bonding.

Chemical bonding, such as melt bonding between polymeric materials, may also occur at the joint interface 26 as a result of the workpieces being pressed together while the thermoplastic material is softened. On a molecular level, the new bond that is formed is at least partly a result of entanglement of polymer chains at opposing surfaces at the joint interface 26. When thermoplastic materials are sufficiently heated and pressed together, the materials of the separate pieces being pressed together may intermingle as the two pieces become one.

One or both of the workpieces 10, 12 may be made from a thermoplastic composite material. A thermoplastic composite material includes a thermoplastic matrix material and a reinforcing material distributed and embedded within the matrix material. The thermoplastic material may be an engineering polymer, such as a polyamide, polycarbonate, or a thermoplastic olefin (TPO). The reinforcing material may be short, long, or continuous fibers made from glass, ceramic, carbon, mineral, or other polymers (e.g., Kevlar), for example. In some embodiments, the workpiece material is a carbon and/or continuous fiber-reinforced thermoplastic (CFRTP). In some embodiments, the workpiece material is a carbon fiber-reinforced thermoplastic in which the reinforcing fibers are discontinuous and/or sufficiently short for injection molding or transfer molding. In some cases, carbon and/or metallic fibers of a fiber-reinforced thermoplastic act as the susceptor material.

The thermoplastic material of the first workpiece 10 and the thermoplastic material of the second workpiece 12 can be the same or different. For example, the thermoplastic material of both workpieces could be polyamide 6 (PA6), whether or not the reinforcing materials are the same. When the thermoplastic materials of the two components are different, the thermoplastic materials can be compatible or incompatible. For purposes of this disclosure, two thermoplastic materials are considered compatible if they are the same, or it they belong to the same polymer family. All polyamides are considered compatible with one another, for example. The same consideration is given to polyolefins, acrylics, styrenics, thermoplastic urethanes, vinyls, polycarbonates (PC), etc. When the thermoplastic material of one workpiece is a thermoplastic alloy, the thermoplastic material of the other workpiece is considered compatible therewith if it includes a thermoplastic component of the alloy. For example, poly(acrylonitrile-butadiene-styrene) (ABS) is considered compatible with a PC/ABS alloy. The same compatibility guidelines apply to the susceptor material 16 when it includes a thermoplastic material.

In some embodiments, the susceptor material 16 is a film that includes a polymeric layer that is compatible with the thermoplastic material of one or both of the workpieces 10, 12. For example, the first workpiece 10 may be formed from a glass-reinforced PA6 material, and the susceptor material 16 may be or may include a layer of polyamide with electrically conductive material (e.g., carbon fibers) embedded therein. In embodiments in which the thermoplastic materials of both workpieces are the same or compatible, the susceptor material 16 may include a layer of polymeric material that is compatible with at least one of the workpiece thermoplastic materials. In other words, when the thermoplastic material of the first workpiece is compatible with the thermoplastic material of the second workpiece, a single layer of polymeric material in the susceptor material can result in good inter-material bonding among all of the polymeric materials at the joint interface. Of course, where the workpiece materials are compatible, no polymer is required in the susceptor material to achieve a good bond. However, including a polymeric layer in the susceptor material may resulting in a better bond than a conductive layer with no polymeric component because the polymer help fill imperfections or gaps that may be present at the joint interface, especially if the workpieces has a high loading of fibers (e.g. carbon fibers) or other fillers.

In embodiments in which the thermoplastic materials of the two workpieces are incompatible, the susceptor material may include a layer of polymeric material that is compatible with each thermoplastic material. For example, if the first workpiece includes polycarbonate and the second workpiece includes ABS, the susceptor material may include a layer of a PC/ABS alloy. In some embodiments, the susceptor material may include one polymeric layer that is compatible with the thermoplastic material of the first workpiece and a second polymeric layer that is compatible with the thermoplastic material of the second workpiece. One or more additional adhesive or compatibilizing layers may also be included between the two polymeric layers of the susceptor material.

Figure 5:
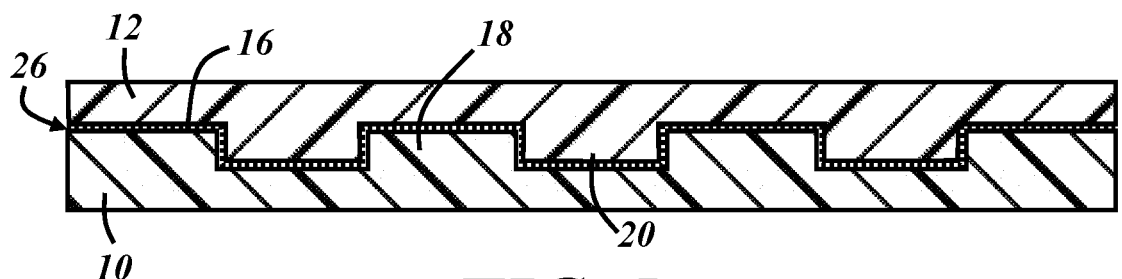
FIG. 5 is a cross-sectional view of the two workpieces of FIG. 4 after being brought together at a joint interface.
Figure 6:
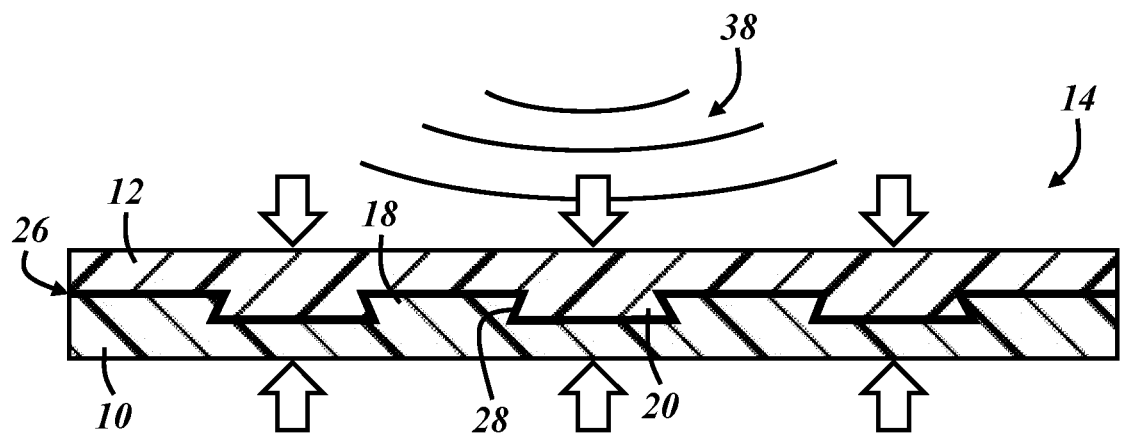
FIG. 6 is a cross-sectional view of the two workpieces of FIG. 4 during induction heating and pressing.

FIGS. 4-6 are cross-sectional views of the same workpieces 10, 12 of FIGS. 1-3 during different stages of the method of joining workpieces. In this example, the susceptor material 16 is introduced between the workpieces 10, 12 in the form of a continuous film spanning the opposing protrusions 18, 20 and receptacles 22, 24 of the workpieces. Due in part to its small thickness, the film of susceptor material 16 is sufficiently flexible to deform and thereby take the shape of the joint interface 26 when the workpieces 10, 12 are brought together as in FIG. 5. The induction heating and pressing of the workpieces are carried out in the same manner as in the example of FIGS. 1-3 to join the workpieces to form a tortuous and continuous joint along the joint interface.

Figure 7:
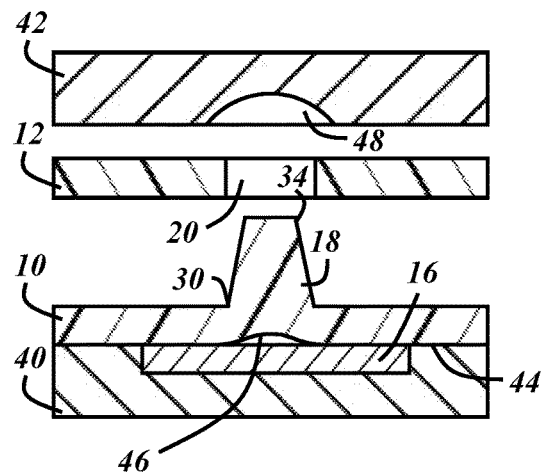
FIG. 7 is a cross-sectional view of two workpieces to be joined in a heat staking tool.
Figure 8:
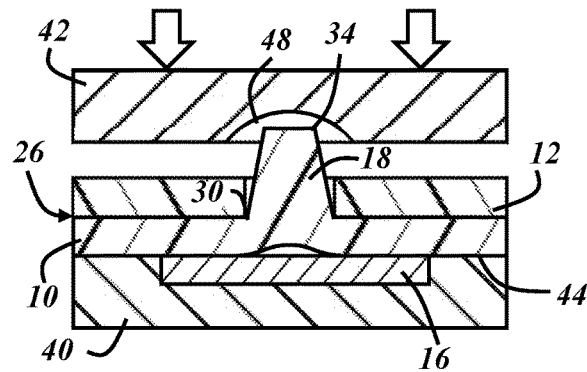
FIG. 8 is a cross-sectional view of the two workpieces of FIG. 7 after being brought together at a joint interface.
Figure 9:
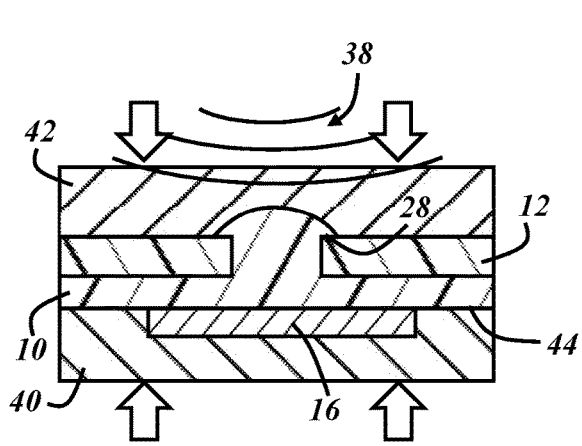
FIG. 9 is a cross-sectional view of the two workpieces of FIG. 7 during induction heating and pressing.
Figure 10:
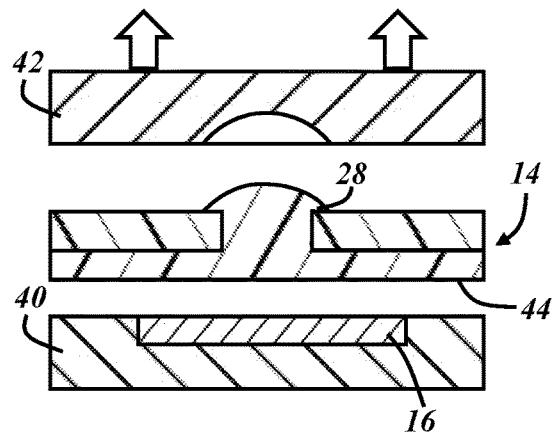
FIG. 10 is a cross-sectional view of the two workpieces of FIG. 7 after being joined.

FIGS. 7-10 are cross-sectional views of another set of first and second workpieces 10, 12 at different stages of the method of joining workpieces to form an assembled article 14. In FIG. 7, the first and second workpieces 10, 12 are arranged between a first portion 40 and a second portion 42 of a heat staking tool. The workpieces are oriented with the protrusion 18 of the first workpiece 10 extending toward the second workpiece 12 and aligned with the receptacle 20 of the second workpiece 12. FIG. 8 illustrates the workpieces 10, 12 after the step of bringing the workpieces together at the joint interface 26, and FIG. 9 illustrates the workpieces during the steps of induction heating and pressing, during which one or both of the workpieces is reshaped and/or the protrusion 18 is deformed to form the interlock 28 at the joint interface 26. FIG. 10 illustrates the assembled article 14 after the tool portions 40, 42 are separated.

In this example, the protrusion 18 is a boss or post and the receptacle 20 is an aperture that extends through the thickness of the second workpiece 12. The height of the protrusion 18 from the base 30 to the distal end 34 is greater than the thickness of the second workpiece at the receptacle 20, and the maximum diameter or width of the protrusion is smaller than the minimum diameter or width of the receptacle. When the workpieces 10, 12 are brought together with the protrusion 18 aligned with and received by the receptacle 20, as in FIG. 8, the protrusion extends entirely through the second workpiece with the base 30 at the joint interface 26 and the distal end 34 on the opposite side of the second workpiece. The joint interface 26 is defined where surfaces of the workpieces oppose each other—i.e., between the horizontal faces of the workpieces and along the vertical walls of the receptacle in FIG. 8.

The first portion 40 of the tool supports the first workpiece 10 and includes the susceptor material 16 in contact with the first workpiece along a side 44 opposite the protrusion 18. In this example, the susceptor material 16 may be in the form of a tool insert, or the first portion of the tool may be constructed from the susceptor material, which does not include a polymeric component in this case. When presented for assembly, the first workpiece 10 has a sink mark 46 generally aligned with the protrusion 18. The sink mark 46 may be considered a visual defect or an undesirable lack of flatness in the first workpiece caused by the locally increased mass of thermoplastic material beneath the protrusion 18. The sink mark 46 may result from a previous plastic molding process due to excess internal shrinkage at locally thick areas of the workpiece.

The surface of the first tool portion 40 that is in contact with the back side 44 of the first workpiece 10 is flat, and the surface of the second portion 42 of the tool includes a recess 48 aligned with the protrusion 18. After the workpieces 10, 12 are brought together, the tool portions 40, 42 are brought toward each other as in FIG. 8. The tool portions 40, 42 are moved toward each other until the second portion 42 of the tool contacts both the first workpiece 10 and the second workpiece 12 and presses the workpieces together, as shown in FIG. 9. The recess 48 of the second portion 42 of the tool, which may be heated or ultrasonically activated, contacts the end 34 of the protrusion 18 before the second tool portion contacts the second workpiece 12 so that the interlock 28 is formed at the end of the protrusion. The interlock 28 is provided by a head formed in the shape of the recess 48 in the second portion 42 of the tool.

In addition to the step of pressing, FIG. 9 also depicts the step of induction heating via application of the induction field 38. In this case, the susceptor material 16 is in contact with the back side 44 of first workpiece 10 so that the induction heated susceptor material 16 conductively heats and thereby softens the thermoplastic material of the first workpiece. The step of pressing is performed at least while the thermoplastic material of the first workpiece 10 is softened. The combined softening of the thermoplastic material and pressing reshapes the first workpiece 10 to at least partially remove the sink mark 46 by forcing the back side 44 of the workpiece to take the flat shape of the surface of the first tool portion 40. In this case, the reshaping via combined induction heating and applied pressure is at a different location than is the deformation of the protrusion 18 to form the interlock 28. However, induction heating may also be applied to a susceptor material in the second portion 42 of the tool to heat the recess 48 for combined heating and reforming of the protrusion to form the interlock 28.

As with the embodiments of FIGS. 1-6, the protrusions 18 and receptacles 20 may vary in number, shape, size, orientation, spacing, layout, mode of deformation to form the interlock, etc., and the workpieces 10, 12 may be formed from the same or different thermoplastic-based materials, including thermoplastic composite materials. In addition, the features of the illustrated embodiments can be combined in various manners. For example, in the examples of FIGS. 1-6 an additional susceptor material may be included as part of a supporting tool portion along the side of the first workpiece 10 opposite the protrusions 18 such that both the joint interface 26 and the back side of the workpiece 10 are heated, softened, and reformed to arrive at the illustrated interlocks 28 with corresponding receptacles of the second workpiece and to simultaneously flatten or remove sink marks from the back side of the first workpiece. In some embodiments, the surface of the first tool portion 40 in contact with the first workpiece is a textured surface with its texture being imparted to the first workpiece when the thermoplastic material is softened. The surface texture can help hide the sink mark, even if it is not completely removed.

In some embodiments one of the workpieces is formed from a non-polymeric material, such as a metallic material. For example, the second workpiece 12 may be formed from a metallic or other non-polymeric material in any of the illustrated examples. In the examples of FIGS. 1-6, the receptacles 22 of the second workpiece 12 may be preformed with undercut features to receive the mating protrusions of the first workpiece 10, the thermoplastic material of which softens and deforms during induction heating to form the interlock 28. In that case, a metallic second workpiece 12 may function as the susceptor material and may be preferentially heated relative to any conductive filler material of the first workpiece. In the example of FIGS. 7-10, a metallic second workpiece 12 may also function as a susceptor material and soften portions of the first workpiece 10 with which it comes into contact. Which of the electrically conductive materials of the workpieces, films, and assembly tools is preferentially heated can also be controlled at least in part by their relative orientations and proximities to the induction field.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of joining workpieces, comprising the steps of:
    bringing a first workpiece and a second workpiece together at a joint interface so that a protrusion of the first workpiece is aligned with a receptacle of the second workpiece, wherein the first workpiece comprises a thermoplastic material;
    induction heating a susceptor material that is in contact with the thermoplastic material such that the thermoplastic material softens;
    pressing the first and second workpieces together while the thermoplastic material is softened, thereby reshaping the first workpiece where the thermoplastic material is softened,
    wherein the protrusion is deformed to form an interlock with the receptacle at the joint interface, and
    wherein the first workpiece includes a sink mark along a side of the first workpiece opposite the protrusion before the step of bringing the workpieces together, the sink mark being at least partially removed by said reshaping of the first workpiece.

2. The method of claim 1, wherein the workpieces are brought together between opposing first and second tool portions with the first workpiece being supported by the first tool portion and the protrusion extending through the second workpiece, and wherein the step of pressing includes moving the first and second tool portions toward each other so that the second tool portion is in contact with both of the first and second workpieces.

3. The method of claim 2, wherein the second tool portion includes a recess aligned with the protrusion such that the protrusion is deformed to form a head at an end of the protrusion, thereby forming the interlock.

4. The method of claim 3, wherein the recess is heated during the step of pressing.

5. The method of claim 1, wherein the susceptor material is at the joint interface during the step of induction heating so that a thermoplastic material of the second workpiece softens during the step of induction heating.

6. The method of claim 1, wherein the susceptor material is a film comprising a polymeric material that is compatible with the thermoplastic material of the first workpiece so that the polymeric material of the film and the thermoplastic material of the first workpiece intermingle and are bonded together when heated and pressed together.

7. The method of claim 1, wherein the susceptor material is a film comprising a first layer of polymeric material that is compatible with the thermoplastic material of the first workpiece and a second layer of polymeric material that is compatible with a thermoplastic material of the second workpiece so that the first layer of polymeric material and the thermoplastic material of the first workpiece intermingle and are bonded together when heated and pressed together and the second layer of polymeric material and the thermoplastic material of the second workpiece intermingle and are bonded together when heated and pressed together, the thermoplastic material of the first workpiece being different from the thermoplastic material of the second workpiece.

8. The method of claim 1, wherein the susceptor material is embedded in the first thermoplastic material before the step of bringing the workpieces together.

9. The method of claim 1, wherein the first workpiece is formed from a thermoplastic composite material comprising electrically conductive fibers distributed within a matrix material, wherein the fibers are the susceptor material and the thermoplastic material is the matrix material.

10. The method of claim 1, wherein the first workpiece, the second workpiece, the susceptor material, or any combination thereof includes carbon fibers before the step of induction heating.

11. The method of claim 1, wherein the protrusion has a width sized to be received by the receptacle before the step of bringing the workpieces together, said width being enlarged when the protrusion is deformed such that the protrusion cannot be removed from the receptacle, thereby forming the interlock.

12. The method of claim 1, wherein a protrusion of the second workpiece is aligned with a receptacle of the first workpiece during the step of bringing the workpieces together and a thermoplastic material of the second workpiece softens during the step of induction heating, the protrusion of the second workpiece being deformed during the step of pressing to form an interlock with the receptacle of the first workpiece.

13. The method of claim 1, wherein the protrusion is one of a plurality of protrusions of the first workpiece and the receptacle is one of a plurality of receptacles of the second workpiece, each protrusion being aligned with a corresponding receptacle during the step of bringing the workpieces together, and wherein a corresponding plurality of interlocks is formed by deformation of each of the protrusions while in each of the corresponding receptacles.

14. The method of claim 1, wherein the susceptor material is at a side of the first workpiece that faces away from the second workpiece during the step of induction heating.

15. The method of claim 1, wherein the susceptor material is part of a tool that is pressed against the first workpiece during the step of pressing such that the tool is heated during the step of induction heating.

16. The method of claim 1, wherein the method includes heat staking the first and second workpieces together.

17. A method of joining workpieces, comprising the steps of:
aligning protrusions of a first thermoplastic composite workpiece with receptacles of a second thermoplastic composite workpiece, each receptacle being sized to receive the respectively aligned protrusion;
bringing the first and second workpieces together at a joint interface with the protrusions received by the receptacles;
induction heating a susceptor material to thereby soften a thermoplastic material of each workpiece at the joint interface; and
pressing the workpieces together while the thermoplastic materials are softened thereby reshaping the first workpiece where the thermoplastic material is softened, so that each protrusion is deformed while received in the respectively aligned protrusion to form a plurality of interlocks at which the workpieces are mechanically fastened together and at which a chemical bond is formed between the workpieces,
wherein the first workpiece includes a sink mark along a side of the first workpiece opposite one of the protrusions before the step of bringing the workpieces together, the sink mark being at least partially removed by said reshaping of the first workpiece.

18. The method of claim 17, wherein the first and second workpieces are made from composites having thermoplastic components that are incompatible with each other, and wherein the susceptor material comprises a film including a first polymeric layer that is compatible with the thermoplastic material of the first workpiece and a second polymeric layer that is compatible with the thermoplastic material of the second workpiece with electrical conductors embedded in one or both layers.

19. A method of joining workpieces, comprising the steps of:
placing a first workpiece comprising a thermoplastic material together with a second workpiece between first and second portions of a heat staking tool so that a protrusion of the first workpiece extends through a receptacle of the second workpiece, wherein the first portion of the tool supports the first workpiece and includes a susceptor material in contact with a side of the first workpiece in which a sink mark is formed opposite the protrusion;
induction heating the susceptor material to thereby soften the thermoplastic material; and
moving at least one of the portions of the heat staking tool toward the other portion until the second portion of the tool contacts both the first workpiece and the second workpiece and presses the workpieces together,
wherein the second portion of the tool includes a recess aligned with the protrusion and contacts the protrusion before contacting the second workpiece so that a head is formed at an end of the protrusion, and
wherein said side of the first workpiece in which the sink mark is formed is reshaped when the first and second workpieces are pressed together while the thermoplastic material is softened to thereby at least partially remove the sink mark.

* * * * *